(12) United States Patent
Wasif et al.

(10) Patent No.: US 12,434,598 B2
(45) Date of Patent: Oct. 7, 2025

(54) ELECTRIC BATTERY TEMPERATURE MONITORING SYSTEM

(71) Applicant: NEW FLYER INDUSTRIES CANADA ULC, Winnipeg (CA)

(72) Inventors: Talha Wasif, Winnipeg (CA); Tyler Jordan Gallant, Winnipeg (CA); Andre Yigal Glicenstajn, Winnipeg (CA); Jennifer Rodriguez Adriano, Winnipeg (CA); Daniel John Murray Potter, Winnipeg (CA); James Bernard McKellar, Anniston, AL (US); Robert Brydon Thomas Owen, Winnipeg (CA)

(73) Assignee: NEW FLYER INDUSTRIES CANADA ULC, Winnipeg (CA)

( * ) Notice: Subject to any disclaimer, the term of this patent is extended or adjusted under 35 U.S.C. 154(b) by 0 days.

(21) Appl. No.: 18/858,708

(22) PCT Filed: Sep. 7, 2023

(86) PCT No.: PCT/IB2023/058875
§ 371 (c)(1),
(2) Date: Oct. 21, 2024

(87) PCT Pub. No.: WO2024/052858
PCT Pub. Date: Mar. 14, 2024

(65) Prior Publication Data
US 2025/0108727 A1    Apr. 3, 2025

Related U.S. Application Data

(60) Provisional application No. 63/404,830, filed on Sep. 8, 2022, provisional application No. 63/415,512, filed on Oct. 12, 2022.

(51) Int. Cl.
H02J 7/00     (2006.01)
B60L 58/24    (2019.01)
H02J 7/14     (2006.01)

(52) U.S. Cl.
CPC ......... *B60L 58/24* (2019.02); *B60L 2240/545* (2013.01)

(58) Field of Classification Search
CPC ................ B60L 58/24; B60L 2240/545
(Continued)

(56) References Cited

U.S. PATENT DOCUMENTS 6,002,240 A * 12/1999 McMahan ............. H01M 10/48
                                                                429/7
6,338,016 B1    1/2002 Miller et al.
(Continued)

FOREIGN PATENT DOCUMENTS

CN    108215895 A    6/2018
WO    WO-2015071587 A1    5/2015

OTHER PUBLICATIONS

PCT/IB2023/058875, Electric Battery Temperature Monitoring System, Sep. 7, 2023.

*Primary Examiner* — Alexis B Pacheco
(74) *Attorney, Agent, or Firm* — Perry + Currier Inc.

(57) ABSTRACT

The present specification provides an electric battery monitoring system. The system has particular application in electric vehicles where there it is desired to balance energy consumption to preserve vehicle range while also periodically monitoring for unsafe conditions that could lead to a thermal event.

20 Claims, 6 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 2003/0185162 | A1* | 10/2003 | Fraser | H04W 52/0277 |
| | | | | 340/7.32 |
| 2006/0016793 | A1* | 1/2006 | Zhu | B60L 58/27 |
| | | | | 219/205 |
| 2007/0257642 | A1* | 11/2007 | Xiao | H02J 7/00308 |
| | | | | 320/134 |
| 2012/0112685 | A1* | 5/2012 | Hartley | H02J 7/0013 |
| | | | | 320/106 |
| 2012/0136535 | A1* | 5/2012 | Buford | B60L 58/33 |
| | | | | 701/36 |
| 2013/0288089 | A1* | 10/2013 | Kinoshita | H01M 10/486 |
| | | | | 429/62 |
| 2018/0366791 | A1* | 12/2018 | Kondo | H02J 7/0031 |
| 2019/0006724 | A1* | 1/2019 | Cho | B60L 58/21 |
| 2019/0064849 | A1* | 2/2019 | O'Hara | H02J 7/0047 |
| 2022/0340012 | A1* | 10/2022 | Zhao | B60L 58/27 |
| 2023/0038882 | A1* | 2/2023 | Zhao | H02J 7/0048 |
| 2023/0261331 | A1* | 8/2023 | Morton | H01M 50/271 |
| | | | | 429/163 |
| 2023/0420966 | A1* | 12/2023 | Hu | H02J 7/00302 |
| 2024/0074495 | A1* | 3/2024 | Yamada | A24F 40/90 |
| 2024/0405313 | A1* | 12/2024 | Reddy | H01M 10/617 |

* cited by examiner

| Event | Vehicle Response | Discharge Current Limit (per string) | Driver Experience | Recommended action |
|---|---|---|---|---|
| Maximum cell temp climbs to 31°C | Vehicle activates battery cooling system | 300A per string (i.e. full current available) | Normal | Continue driving, no maintenance checks required. |
| Maximum cell temp climbs to 31°C | ESS Overtemperature Warning DTC's | 300A per string | Normal | Continue driving, coolant system check should be done upon return from service. |
| Maximum cell temp climbs between 35°C and 40°C | ESS progressively de-rates available current. | Linear derate from 300A down to 63A per string as maximum cell temperature climbs from 35°C to 40°C | Progressive reduction in available vehicle power. | The vehicle may be driven on reduced power back to the depot, or a road call can be made. The battery cooling system should be investigated for malfunctions. |
| Maximum cell temp climbs to 40°C | ESS issues Overtemperature Alarm DTC and reduces available current. | 63A per string | Amber HIGH BATT TEMP indicator displayed on dash. Vehicle remains drivable, but with reduced available power. | The vehicle may be driven on reduced power back to the depot, or a road call can be made. The battery cooling system should be investigated for malfunctions. |
| Maximum cell temp climbs between 40°C and 45°C | ESS progressive power de-rates continue. | Linear derate from 63A down to 0A per string as maximum cell temperature climbs from 40°C to 45°C | Significant reduction in vehicle power, to the point that no power discharge will be allowed at the 45°C limit. | Road call will likely be necessary depending on maximum cell temperature, as the vehicle may not be drivable. Vehicle would be safe to tow as necessary. |
| Maximum cell temp climbs between 45°C (111e batteries) 48°C (125e batteries) | ESS available current now at 0A. Overtemprature error DTC's & open contactor faults will occur | 0A | Red HV BATT FAIL indicator. Stage 1 Temperature Alarm. Zero vehicle power available. | Road call will necessary. Please also refer to slide 10 recommendations. The battery cooling system should be investigated for malfunctions. |

FIG. 6

ELECTRIC BATTERY TEMPERATURE MONITORING SYSTEM

CROSS-REFERENCE TO RELATED APPLICATIONS

This application claims the benefit of U.S. Provisional Patent Application No. 63/404,830, filed Sep. 8, 2022, entitled "XCELSIOR CHARGE AUTOMATED BATTERY TEMPERATURE CHECK FEATURE", and U.S. Provisional Patent Application No. 63/415,512, filed Oct. 12, 2022, entitled "ELECTRIC BATTERY TEMPERATURE MONITORING SYSTEM"; the entire contents of each of which are incorporated herein by reference.

BACKGROUND

Electric vehicles are a critical aspect of converting to a carbon-neutral society. The transition from fossil fuel vehicles to electric vehicles has been and continues to be long and challenging. The usual cited challenges of transitioning to electric vehicles lie around issues like range, charging infrastructure, and manufacturing capacity. These issues are appearing to be quite resolvable and the potential to scale the number of electric vehicles on the road is now within reach. At the same time, the transition is fragile and there have been setbacks such as spectacular battery fires that, to the lay person, appear to start for no reason.

SUMMARY

An aspect of the specification provides a controller for an electric vehicle including: a processor connected to an electric vehicle power supply system of the electric vehicle; a memory for storing programming instructions that when executed by the processor configure the processor to: enter a sleep mode drawing a lower level of power from the vehicle power supply system; wake from the sleep mode according to a first criteria; perform a temperature check of the power supply system drawing a higher level of power from the vehicle power supply system; return to the sleep mode if the temperature check falls below a first threshold; and, enter a first alarm state if the temperature check exceeds the first threshold.

An aspect of the specification provides a controller wherein first criteria is a predefined period of time.

An aspect of the specification provides a controller wherein the predefined period of time is about two hours.

An aspect of the specification provides a controller wherein the predefined period of time is dynamically changed via a network interface connected to the processor based on comparative data of when the temperature check is performed in other vehicles without entering the alarm state in other vehicles.

An aspect of the specification provides a controller wherein the first alarm state is based on a temperature threshold that is above a predefined safety limit but below a temperature associated with fire in the vehicle power system of at least one other vehicle having the same vehicle power system.

An aspect of the specification provides a controller wherein the first threshold is at least one of: an internal temperature of a case of a battery in the vehicle power system reading above about seventy degrees centigrade; and a temperature sensor input device a cell of one of the battery in the vehicle power system reading above about forty-eight degrees centigrade.

An aspect of the specification provides a controller wherein the processor is further configured to enter a second alarm state if the temperature exceeds a second threshold.

An aspect of the specification provides a controller wherein the second threshold is above or below a temperature associated with fire in the vehicle power system of at least one other vehicle having the same vehicle power system.

An aspect of the specification provides a controller wherein the second threshold is at least one of: an internal temperature of a case of a battery in the vehicle power system reads above about seventy-five degrees centigrade; and a temperature sensor input device a cell of one of the battery in the vehicle power system reads above about fifty-five degrees centigrade.

An aspect of the specification provides a method for monitoring the battery temperature in an electric vehicle including: entering a sleep mode drawing a lower level of power from an vehicle power supply system; waking from the sleep mode according to a first criteria; performing a temperature check of the vehicle power supply system drawing a higher level of power from the vehicle power supply system; returning to the sleep mode if the temperature check falls below a first threshold; and, entering a first alarm state if the temperature check exceeds the first threshold.

An aspect of the specification provides a method wherein first criteria is a predefined period of time.

An aspect of the specification provides a method wherein the predefined period of time is about two hours.

An aspect of the specification provides a method wherein the predefined period of time is dynamically changed via a network interface connected to the processor based on comparative data of when the temperature check is performed in other vehicles without entering the alarm state in other vehicles.

An aspect of the specification provides a method wherein the first alarm state is based on a temperature threshold that is above a predefined safety limit but below a temperature associated with fire in the vehicle power system of at least one other vehicle having the same vehicle power system.

An aspect of the specification provides a method wherein the first threshold is at least one of: an internal temperature of a case of a battery in the vehicle power system reading above about seventy degrees centigrade; and a temperature sensor input device a cell of one of the battery in the vehicle power system reading above about forty-eight degrees centigrade.

An aspect of the specification provides a method wherein the processor is further configured to enter a second alarm state if the temperature exceeds a second threshold.

An aspect of the specification provides a method wherein the second threshold is above or below a temperature associated with fire in the vehicle power system of at least one other vehicle having the same vehicle power system.

An aspect of the specification provides a method wherein the second threshold is at least one of: an internal temperature of a case of a battery in the vehicle power system reads above about seventy-five degrees centigrade; and a temperature sensor input device a cell of one of the battery in the vehicle power system reads above about fifty-five degrees centigrade.

BRIEF DESCRIPTION OF THE FIGURES

FIG. 6 shows a table of functions that can be performed by the controller of FIG. 4 during the wake mode.

DETAILED DESCRIPTION

Figure 1:
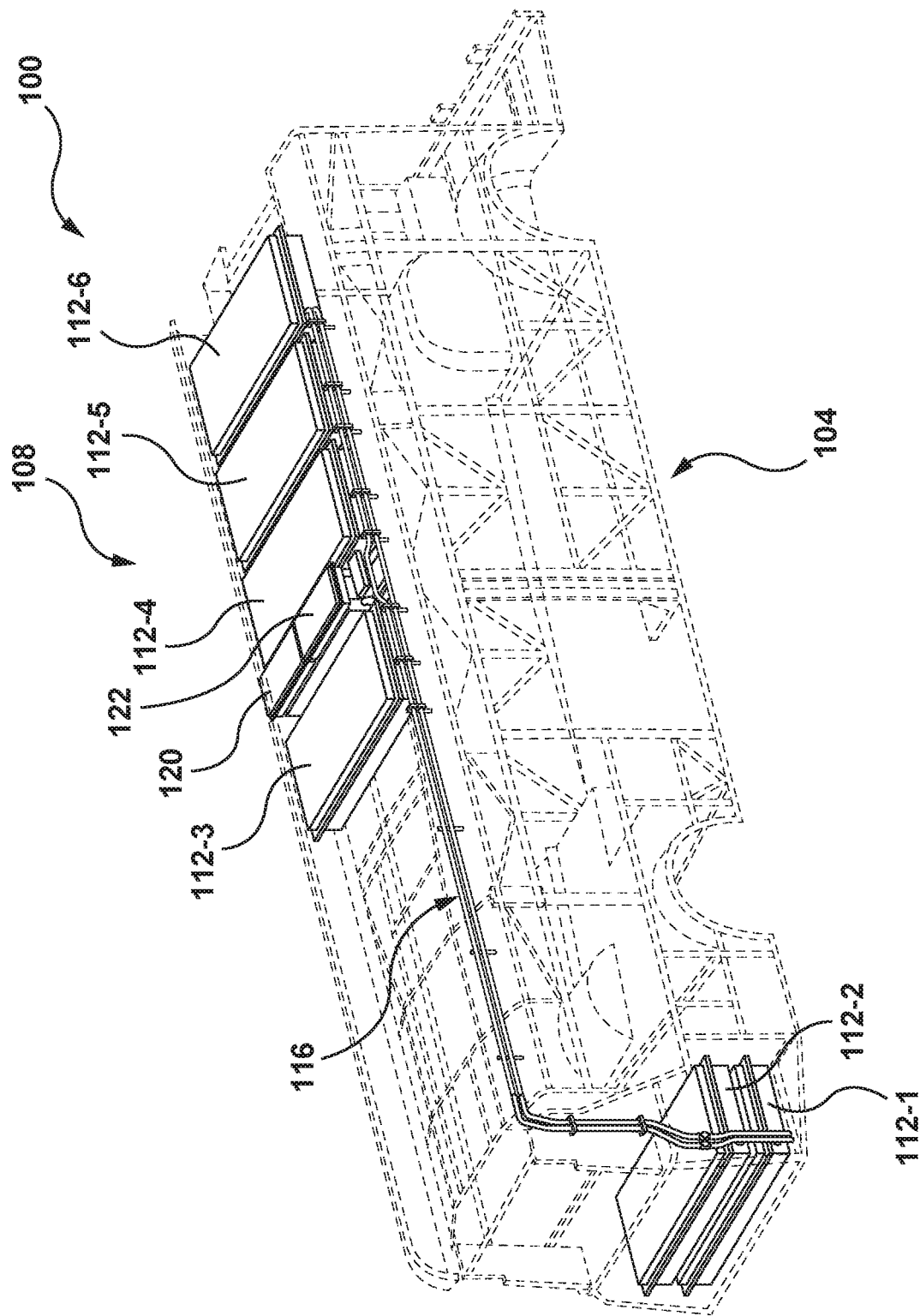
FIG. 1 is a perspective view of the chassis and power supply system of an electric bus.

FIG. 1 shows a portion of an electric vehicle 100 in the form of a bus chassis 104 (shown in dotted lines) and a power supply system 108 (shown in solid lines). Power supply system 108 comprises a plurality of energy storage sub-systems 112-1, 112-2, 112-3, 112-4, 112-5, 112-6. (Collectively, energy storage sub-systems 112-1, 112-2 ... 112-n are referred to as energy storage sub-systems 112 or ESSs 112, and generically, as energy storage system 112 or ESS 112. This nomenclature is used elsewhere herein.) Power supply system 108 also comprises a cooling sub-system 116 and at least one vehicle controller 120 and a temperature monitoring controller 122.

Figure 2:
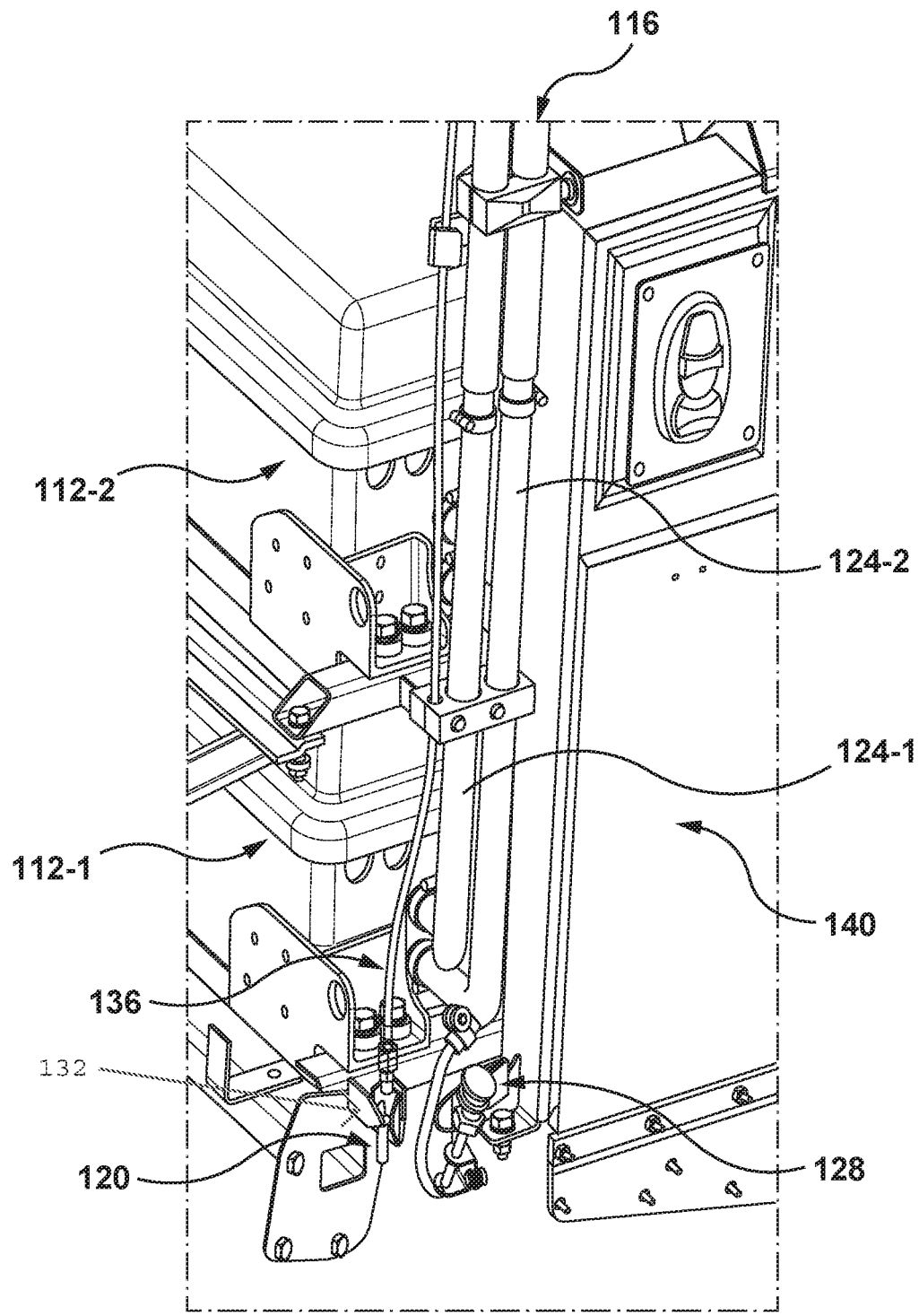
FIG. 2 is a portion of the cooling sub-system of the power supply system of FIG. 1.

FIG. 2 shows a portion of FIG. 1 located near ESS 112-1 and ESS 112-2 and the portion of cooling sub-system 116. As seen in FIG. 2, cooling sub-system 116 includes a first coolant line 124-1 and a second coolant line 124-2. Each coolant line 124 passes through the wall of each ESS 112 to deliver coolant flow and thereby provide heat reduction to each ESS 112. While not shown in the Figures, a similar configuration exists for each ESS 112. FIG. 2 also shows a fill port 128 for adding additional coolant, a valve 132 for draining coolant from a vent line 136. A fuse box 140 is also provided to interrupt electrical current flow in the event of electrical shorts or other faults within power supply system 108.

Figure 3:
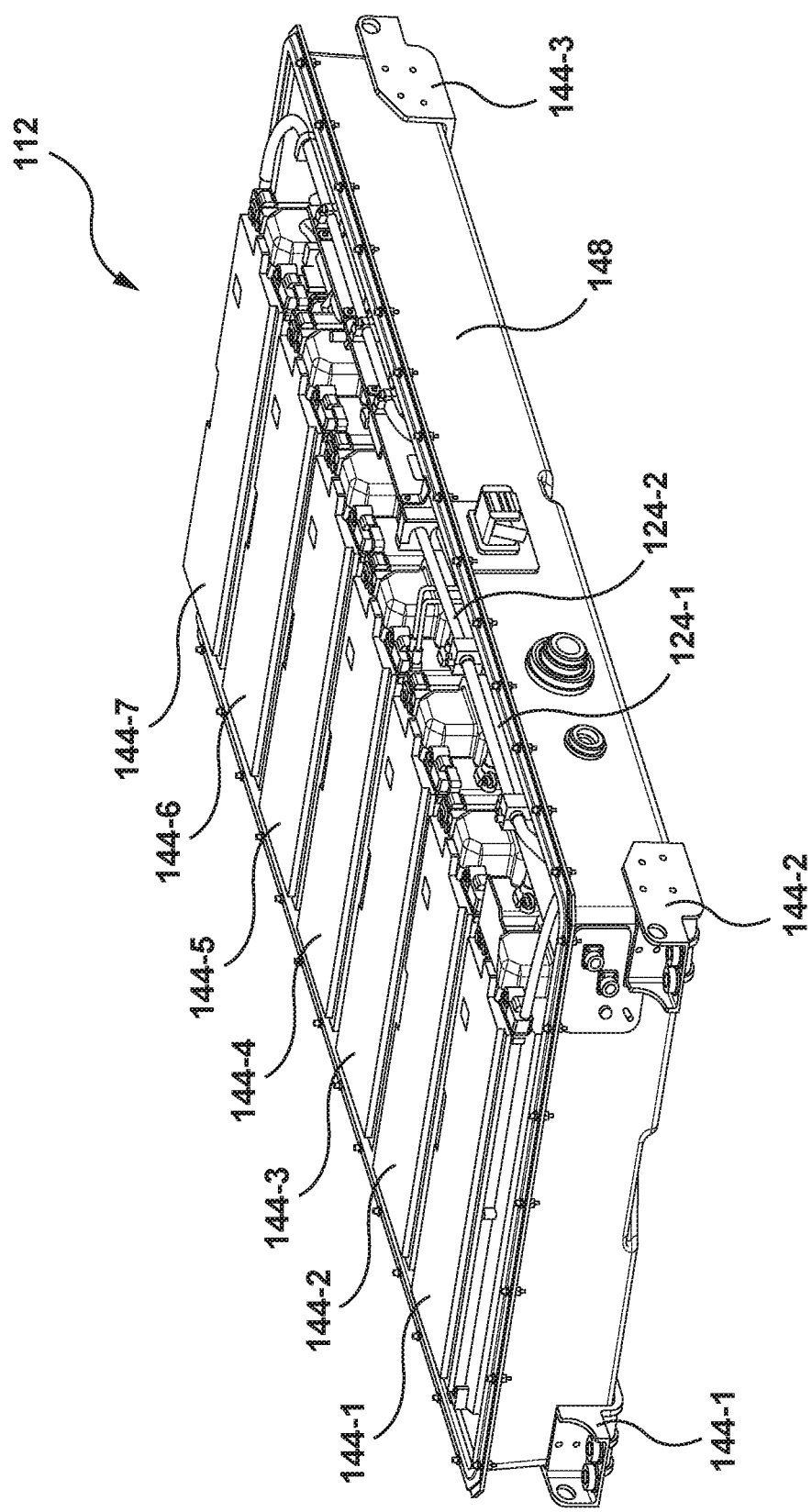
FIG. 3 shows one of the energy storage sub-systems of the power supply system of FIG. 1.

FIG. 3 shows an example of the interior of ESS 112 in greater detail. Each ESS comprises a plurality of battery cells 144, which are in the present example are lithium-ion. Coolant lines 124 are shown as passing through the interior of ESS 112. Mounting brackets 144 are disposed on each corner of a casing 148 for securely mounting ESS 112 to chassis 104.

As noted in FIG. 1, the power system 108 of vehicle 100 also includes at least one vehicle controller 120. Vehicle controller 120 can be based on any standard, known control device (or a plurality of devices) used for delivering energy from power system 108 to drive vehicle 100, such as sending electrical energy to the power train, lighting systems, heating, ventilation, cooling, door control systems and lighting, and for charging functions delivering charge to ESS 112 from external charging sources and dynamic braking from the wheels of vehicle 100.

Figure 4:
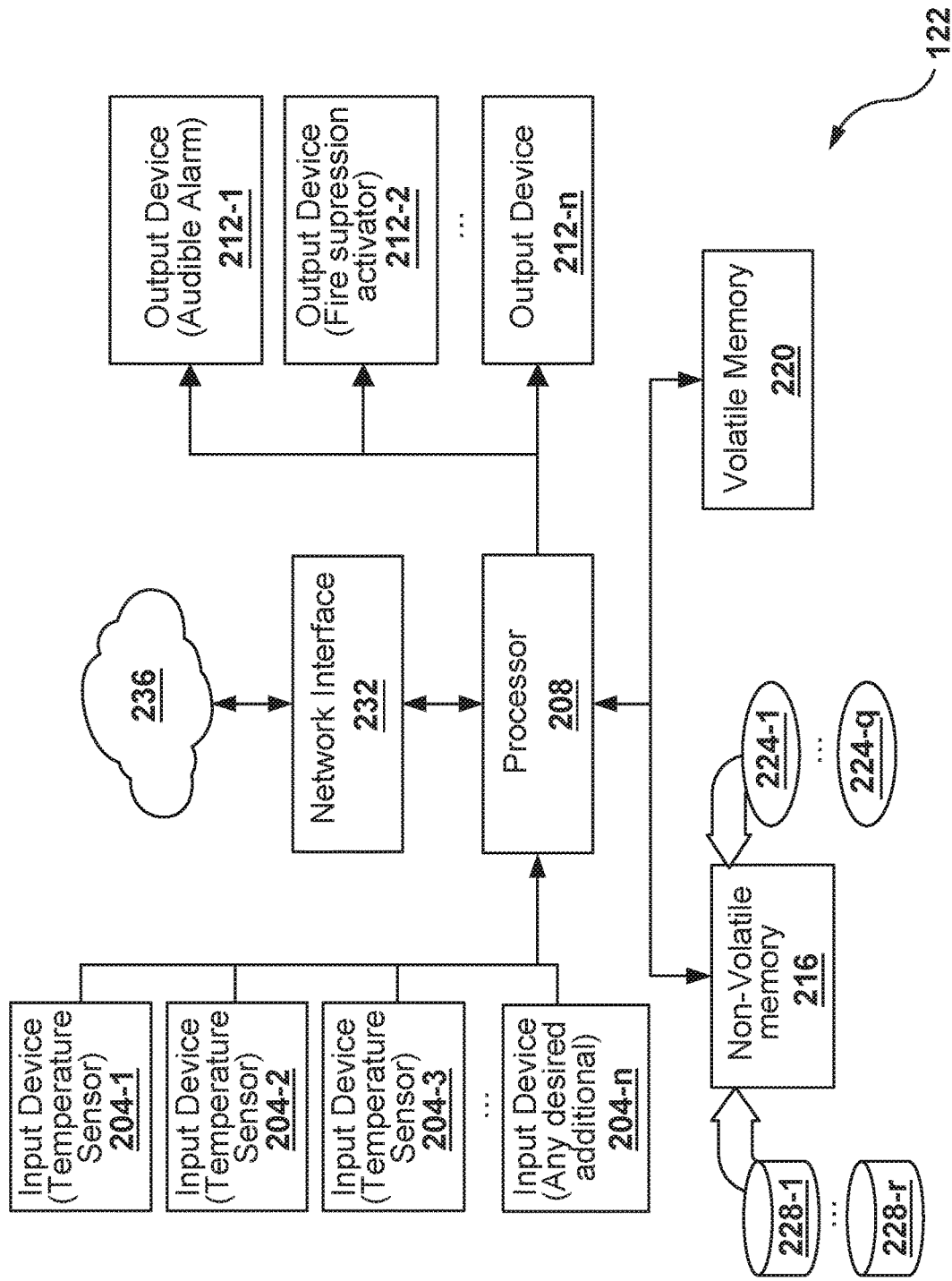
FIG. 4 is a block diagram of the temperature monitoring controller of the power supply system of FIG. 1.

FIG. 4 shows a schematic diagram of a non-limiting example of internal components of temperature monitoring controller 122. Controller includes at least one input device 204. Input from devices 204 is received at a processor 208 which in turn controls at least one output device 212. In the present embodiment, input devices 204 include an override switch, at least one temperature sensor (typically at least one sensor respective to associated with each ESSs 112 or other components on vehicle 100), and any other desired other input devices 204 such as voltage sensors, current sensors, charge level sensors. Likewise output device 212 can be an audible alarm, a fire suppression system and any other desired output devices such as fans, lights, displays.

Processor 208 may be implemented as a plurality of processors or one or more multi-core processors. The processor 208 may be configured to execute different programming instructions responsive to the input received via the one or more input devices 204 and to control one or more output devices 212 to generate output on those devices.

To fulfill its programming functions, the processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of harddisk, or combinations of them. Non-volatile memory 216 may also be described as a non-transitory computer readable media. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Programming instructions in the form of applications 224 are typically maintained, persistently, in non-volatile memory 216 and used by the processor 208 which reads from and writes to volatile memory 220 during the execution of applications 224. One or more tables or databases 228 can also be maintained in non-volatile memory 216 for use by applications 224.

Processor 208 can also connect to a network 236 via a network interface 232 which includes a buffer and a modulator/demodulator or MODEM. Network 236 can thus be a wired bus that terminates in a port that accommodates a combined input/output device in the form of a diagnostic computer. Network 236 can also be more expansive to include the Internet, thereby allowing controller 120 to be accessed from a remote location, and allow for program updates in non-volatile memory 216 to be updated remotely or data stored on non-volatile storage to be downloaded from controller 122.

Controller 122 can be implemented using a programmable logic controller (PLC).

Figure 5:
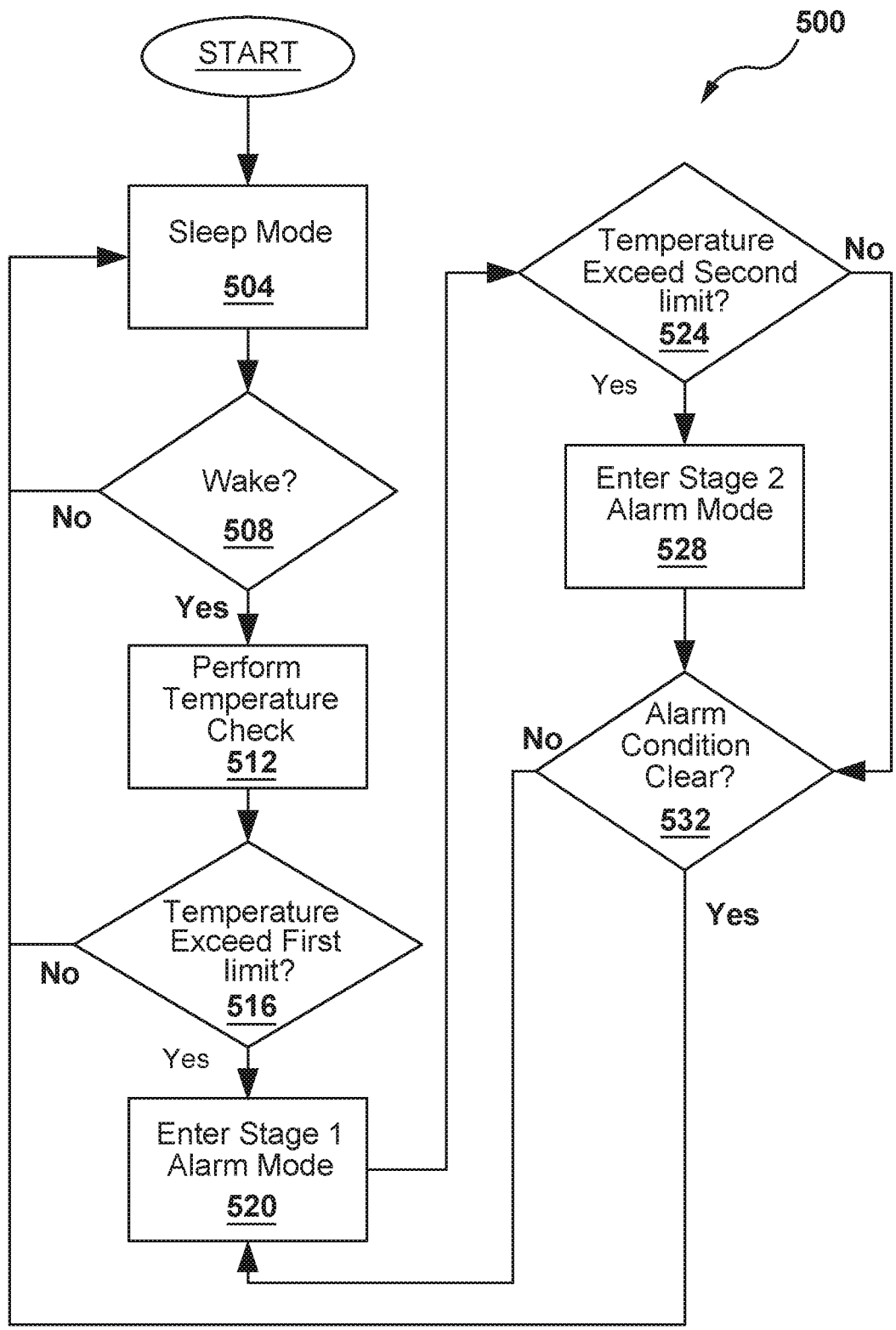
FIG. 5 shows a flowchart depicting a method for monitoring the temperature of the energy storage systems of the power supply system of FIG. 1.

FIG. 5 shows a flowchart depicting a method for monitoring the temperature of an electric battery indicated generally at 500. Method 500 can be implemented on a controller, such as temperature monitoring controller 122 of vehicle 100. Method 500 can be stored as code within non-volatile memory 216 as one or more applications 224. Persons skilled in the art may choose to implement method 500 on vehicle 100 or variants thereon, or with certain blocks omitted, performed in parallel or in a different order than shown. Method 500 can thus be varied. However, for purposes of explanation, method 500 as per the flow chart of FIG. 5 and will be described in relation to its performance on vehicle 100.

Block 504 comprises entering a sleep mode. In the example of vehicle 100, temperature monitoring controller 122 remains in a sleep mode so as to reduce and otherwise preserve the amount of stored energy in power supply system 108. The sleep mode can be activated during vehicle storage, or during regular vehicle operation.

Block 508 comprises entering a determination as whether to enter a wake mode. On a "no" determination method 500 cycles back to method 504. On a "yes" determination method 500 proceeds to block 512.

The criteria for the determination at 508 is not particularly limited, but is based on balancing efficient use of energy with power supply system 108, so as to maximize range of vehicle 100, against the possibility that power supply system 108 is experiencing thermal overload. To elaborate, one of the challenges of electric vehicles is preserving the stored energy in ESS 112, and so when vehicle 100 is not in use it is advantageous to deactivate all systems that consume energy. At the same time, even during storage and times of deactivation, electric vehicles can be susceptible to explosions caused by venting of toxic, flammable gases from a lithium-ion battery leading to thermal runaway and eventual violent combustion of the resulting vapour cloud. Accordingly, if all systems on vehicle 100 are deactivated, temperature monitoring is not possible and thus the risk of a fire or explosion is not detectable. Controller 122 is thus designed to be perform power checks in a judicious manner that balances both safety and energy efficiency.

It is thus contemplated that the criteria at block 508 may change over time, and be periodically updated via network 236, particularly as the behaviours of power supply systems 108 in fleets of similar electrical vehicles become known. In the event, for example, that as vehicles of the same fleet begin to experience thermal overloads under certain conditions, then criteria for a "yes" determination can be formulated that activate thermal monitoring of power system 108 before the thermal overload conditions can occur. It is also contemplated that a machine learning algorithm that establishes the criteria for a "yes" condition can evolve over time and is within the scope of the present specification.

A present example criteria for a "yes" determination at block 508 includes a) two hours from when the vehicle has been shut down or b) two hours from the previous "yes" determination. Again it is expected that this criteria can evolve over time.

A "yes" determination at block 508 leads to block 512, at which point a temperature check is performed. In vehicle 100, controller 122 receives temperature readings from all temperature sensor input devices 204 that are associated with power system 108 and ESSs 112.

At block 516, a determination is made as to whether the temperature reading has exceeded a first limit. Again, the chosen temperature is not particularly limited but rather reflects a first threshold beyond which ESSs 112 are deemed to be outside of a safe range and the potential for a flammable vapour cloud or other hazard exists. It is again contemplated that this threshold value can change and evolve over time as the behavior of the fleet of similar vehicles becomes understood.

In a present example embodiment, three possible criteria are contemplated for reaching a "yes" determination at block 516. First, an internal temperature sensor input device 204 inside any case 148 reads above about seventy degrees centigrade. Second, any individual temperature sensor input device 204 of a given cell 144 reads above about forty-eight degrees centigrade. Third, any diagnostic trouble code of a temperature monitoring system associated with the manufacturer of a given ESS 112 can also be fed into an input device 204 as an indicator that a threshold temperature has been exceeded. Other criteria, however, are also contemplated and will now occur to those skilled in the art.

A "no" determination at block 516 returns method 500 to sleep mode at block 504. A "yes" determination leads method 500 to block 520.

Block 520 comprises entering a first alarm mode, or a "Stage 1" alarm mode. The first alarm mode begins activate an output device 212-1, such as to flash the hazard lamps of vehicle 100 and/or activating the "back-up" alarm during regular interval, currently suggested to be once every five seconds. (i.e. a "back-up" alarm usually indicates vehicle 100 is in reverse when vehicle 100 is in motion.) The first alarm mode indicates that an explosive condition could be occurring and invites investigation for vehicle maintenance and possible further actions to preserve safety of individuals and property. The Stage 1 alarm mode also contemplates sending alerts over 236 to connected devices warning that power system 108 of vehicle 100 is overheating. Such an alarm can be in accordance with the Society of Automotive Engineers (SAE) J1919 Standard.

Block 524 and block 528 are similar to block 516 and block 520, in that block 524 evaluates whether temperatures have exceeded a second limit, and block 528 activates a "Stage 2" alarm mode.

In a present example embodiment, three possible criteria are contemplated for reaching a "yes" determination at block 524. First, an internal temperature sensor input device 204 inside any case 148 reads above about seventy-five degrees centigrade. Second, any individual temperature sensor input device 204 of a given cell 144 reads above about fifty-five degrees centigrade. Third, a fire detector inside a given ESS 112 indicates a fire as a fault code. Other criteria, however, are also contemplated and will now occur to those skilled in the art.

At block 528, a Stage 2 alarm mode can include any of the output actions of Stage 1, and may also include a more frequent audible alarm, such as about twice per second. Further, if the vehicle 100 is so equipped a fire suppression system could be activated via output device 212-2. In general, a Stage 2 alarm indicates that a fire is occurring or is imminently occurring.

A person skilled in the art will again now recognize that if Stage 2 alarms are activated in different vehicles 100 of the same or similar fleet, the criteria that coincided with the Stage 2 alarm can be noted so that the criteria at block 508 and/or block 516 (such as shortening the time interval for a "Yes" event at block 508, or lowering the temperature threshold for a Stage 1 alarm at block 516) of other vehicles so that the likelihood of a Stage 2 alarms can be reduced in those other vehicles.

Controller 122 can also be configured so that each time block 512 occurs, regardless of whether a "yes" is reached at block 516, data is collected for later analysis. Data that can be collected and transmitted over network 236 and/or stored in database 228-1 can including:

ESS 112 Current
ESS 112 State of Charge
ESS 112 State of Health
ESS 112 average cell temperature
ESS 112 maximum cell temperatures and the associated string ID
ESS 112 minimum, maximum cell voltages and the associated string ID
All Diagnostic Trouble Codes present As discussed earlier, ongoing optimization of method 500 is designed to minimize energy draw from power supply system 108 while at the same time performing periodic temperature checks sufficient to reduce and/or prevent thermal runaway. According to investigations performed by the inventors, a typical sleep current for a test bus is about 600 mA. The added current draw during block 512 of a Battery Temperature Check mode can be about 3.6 A, for two minutes, every two hours. Thus according to this example bus with two 100 Ah Absorbent Glass Matt ("AGM") batteries will see its low-voltage batteries drain from fully charged down to about 80% State of Charge ("SoC") in about 80 hours, vs about 93 hours without block 512 being performed. This is an early example and further optimization of utilization of method 500 while minimizing energy drawn and preserving safety conditions of power supply system 108 is achieved through adjusting criteria at block 508, as well as block 516 and block 524.

The following may be effected if a stage 1 temperature fault occurs

- Vehicle should be shutdown with the High Voltage (HV) interlock set to disable, while keeping low voltage 24V knife switch "on" to allow for on-going performance of method 500.
- Towing to a safe location can be done as long as vehicle continues to be actively monitored
- Vehicle should be moved to a secluded location outdoors
- Notify first responders of potential temperature event, requesting first responders to be on standby, either remotely or onsite, depending on established local response protocols
- Remove obvious heat sources, open engine compartment doors for monitoring/ventilation
- If safe to do so, consider removal of manual service disconnect ("MSD") protection devices from all accessible ESS strings
- Stage 1 alerts will likely trigger. If desired, this can be silenced by activating a defined set of equipment.
- Monitor the vehicle for as long as needed to confirm interventions were successful
- Check devices connected over network 236 for indications of which string has experienced an issue
- Monitor the maximum cell temperature to assess if interventions are reducing temperature
- Monitoring should take place until ESS temperatures drop back to a safe level (below 40° C.)
- Assuming interventions successful, troubleshooting and repair process would then proceed The following responses may be effected if a stage 2 temperature fault occurs

- First responders should immediately be contacted if not already. They should be onsite and ready to enact agreed upon emergency response procedures as soon as possible
- On advice of first responders, open the knife switch to disable controller 122 if safe to do so. Note that monitoring by NFI Connect or other diagnostics will cease once this action is taken
- Towing of vehicle, if required, should only be done with approval and direct supervision of emergency responders (if vehicle is not already in a secure location)
- Onsite emergency responders should be prepared at this point to start active suppression of a thermal event (should one occur) as per agreed upon emergency response procedures
- If thermal event does not occur, direct monitoring of vehicle should occur for as long as necessary, potentially for a period beyond 24 hours or more
- General diagnostic data can be monitored over network 236 if controller 122 is still enabled, otherwise visual monitoring will be needed along with manual temperature checks
- Monitor to continue until ESS temperatures drop back to a safe level (below 40° C.)
- Root cause investigation would proceed only after vehicle is rendered safe.

In another embodiment, FIG. 6 shows another set of ongoing activities that can be performed by controller 122 if controller 122 is awake and not in sleep mode.

In view of the above it will now be apparent that variants are contemplated. For example, the foregoing has been discussed in relation to electric busses. Indeed, ESS 112 and other components herein can be custom designed and/or sourced from a manufacturer such as XALT Energy of Midland Michigan. Thus a person skilled in the art, with the benefit of the entirety of this specification, will appreciate that the elements in FIG. 1, FIG. 2 and FIG. 3 are an example configuration to which the teachings herein can be applied, but that other electric vehicle configurations of chassis and ESSes are contemplated that can be used with the controller disclosed herein.

As another example, while not shown in FIG. 5, in variants any of the alarms, such as the backup alarm, may be silenced via an override switch input device 204-1, such as simultaneously pressing two turn signal pedals within vehicle 100, or any other input signal as desired. This would not necessarily, however, clear the alarm itself, merely deactivate some of the audible signals.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A controller for an electric vehicle comprising:
a processor connected to an electric vehicle power supply system of the electric vehicle;
a network interface interconnecting the processor and a network for receiving communications over the network;
a memory for storing programming instructions that when executed by the processor configure the processor to:
enter a sleep mode drawing a lower level of power from the vehicle power supply system;
wake from the sleep mode according to a first criteria; the first criteria based on comparative data across a plurality of vehicles; the first criteria updatable via program updates received over the network;
perform a first temperature check of the power supply system drawing a higher level of power from the vehicle power supply system;
return to the sleep mode if the temperature check falls below a first threshold; the first threshold based on comparative data across the plurality of vehicles; the first threshold updatable via program updates received over the network;
enter a first alarm state if the first temperature check exceeds the first threshold;
while in the first alarm state;
 perform a second temperature check of the power supply system;
 enter a second alarm state if the second temperature check exceeds a second threshold; the second threshold updatable via program updates received over the network.

2. The controller of claim 1 wherein first criteria is a predefined period of time.

3. The controller of claim 2 wherein the predefined period of time is about two hours.

4. The controller of claim 2 wherein the predefined period of time is dynamically changed via a network interface connected to the processor based on comparative data of when the first temperature check is performed in other vehicles without entering the alarm state in other vehicles.

5. The controller of claim 1 wherein the first alarm state is based on the first temperature threshold being above a predefined safety limit but below a temperature associated with fire in the vehicle power system of at least one other vehicle having the same vehicle power system.

6. The controller of claim 1 wherein the first threshold is at least one of: an internal temperature of a case of a battery in the vehicle power system reading above about seventy degrees centigrade; and a temperature sensor input device a cell of one of the battery in the vehicle power system reading above about forty-eight degrees centigrade.

7. The controller of claim 1 wherein the first alarm state comprises activating a visual or audible alert and the second alarm state comprises activating an onboard fire suppression system.

8. The controller of claim 1 wherein the second threshold is below a temperature associated with fire in the vehicle power system of at least one other vehicle having the same vehicle power system.

9. The controller of claim 8 wherein the second threshold is at least one of: an internal temperature of a case of a battery in the vehicle power system reads above about seventy-five degrees centigrade; and a temperature sensor input device at a cell of one of the battery in the vehicle power system reads above about fifty-five degrees centigrade.

10. A method for monitoring the battery temperature in an electric vehicle comprising:
   entering a sleep mode drawing a lower level of power from a vehicle power supply system;
   waking from the sleep mode according to a first criteria; the first criteria based on comparative data across a plurality of vehicles;[1] the first criteria updatable via program updates received over the network;[2]
   performing a first temperature check of the vehicle power supply system drawing a higher level of power from the vehicle power supply system;
   returning to the sleep mode if the temperature check falls below a first threshold; the first threshold based on comparative data across the plurality of vehicles; the first threshold updatable via program updates received over the network;
   entering a first alarm state if the first temperature check exceeds the first threshold;
   while in the first alarm state;
   perform a second temperature check of the power supply system;
   enter a second alarm state if the second temperature check exceeds a second threshold; the second threshold updatable via program updates received over the network.

11. The method of claim 10 wherein first criteria is a predefined period of time.

12. The method of claim 11 wherein the predefined period of time is about two hours.

13. The method of claim 11 wherein the predefined period of time is dynamically changed via a network interface connected to the processor based on comparative data of when the first temperature check is performed in at least one other vehicle without entering the alarm state in the at least one other vehicle.

14. The method of claim 10 wherein the first alarm state is based on the first temperature threshold being above a predefined safety limit but below a temperature associated with fire in the vehicle power system of at least one other vehicle having the same vehicle power system.

15. The method of claim 10 wherein the first threshold is at least one of: an internal temperature of a case of a battery in the vehicle power system reading above about seventy degrees centigrade; and a temperature sensor input device a cell of one of the battery in the vehicle power system reading above about forty-eight degrees centigrade.

16. The method of claim 10 wherein the first alarm state comprises activating a visual or audible alert and the second alarm state comprises activating an onboard fire suppression system.

17. The method of claim 10 wherein the second threshold is below a temperature associated with fire in the vehicle power system of at least one other vehicle having the same vehicle power system.

18. The method of claim 17 wherein the second threshold is at least one of: an internal temperature of a case of a battery in the vehicle power system reads above about seventy-five degrees centigrade; and a temperature sensor input device a cell of one of the battery in the vehicle power system reads above about fifty-five degrees centigrade.

19. The controller of claim 1 wherein at least one of the first criteria, the first threshold and the second threshold can be based on machine learning.

20. The method of claim 10 wherein at least one of the first criteria, the first threshold and the second threshold can be based on machine learning.

\* \* \* \* \*